Oct. 20, 1964 V. C. HALL ETAL 3,153,698

SYSTEM IN FACSIMILE SCANNING FOR CONTROLLING CONTRAST

Filed May 16, 1961 4 Sheets-Sheet 1

INVENTORS.
VINCENT C. HALL &
JOHN A. C. YULE
BY Brumbaugh, Free, Graves & Donohue
their ATTORNEYS

SYSTEM IN FACSIMILE SCANNING FOR CONTROLLING CONTRAST

Filed May 16, 1961 4 Sheets-Sheet 2

INVENTORS.
VINCENT C. HALL &
JOHN A. C. YULE
BY Brumbaugh, Free, Graves & Donohue
their ATTORNEYS

SYSTEM IN FACSIMILE SCANNING FOR CONTROLLING CONTRAST

Filed May 16, 1961 4 Sheets-Sheet 3

INVENTORS.
VINCENT C. HALL &
JOHN A. C. YULE
BY Brumbaugh, Free, Graves & Donohue
their ATTORNEYS

SYSTEM IN FACSIMILE SCANNING FOR CONTROLLING CONTRAST

Filed May 16, 1961 4 Sheets-Sheet 4

INVENTORS.
VINCENT C. HALL &
JOHN A. C. YULE
BY Brumbaugh, Free, Graves & Donohue
their ATTORNEYS United States Patent Office 3,153,698 Patented Oct. 20, 1964

3,153,698

SYSTEM IN FACSIMILE SCANNING FOR CONTROLLING CONTRAST

Vincent C. Hall, Stamford, Conn., and John A. C. Yule, Rochester, N.Y., assignors to Eastman Kodak Company, Rochester, N.Y., a corporation of New Jersey Filed May 16, 1961, Ser. No. 110,543
5 Claims. (Cl. 178—5.2)

This invention relates generally to facsimile systems for reproducing a black and white or colored replica of an original subject. More particularly, this invention relates to facsimile systems of such character wherein the contrast in the replica is selectively controlled in a localized manner in dependence on the localized contrast in the original subject.

For a better understanding of the invention, reference is made to the following description as taken in conjunction with the accompanying drawings in which.

Figure 1:
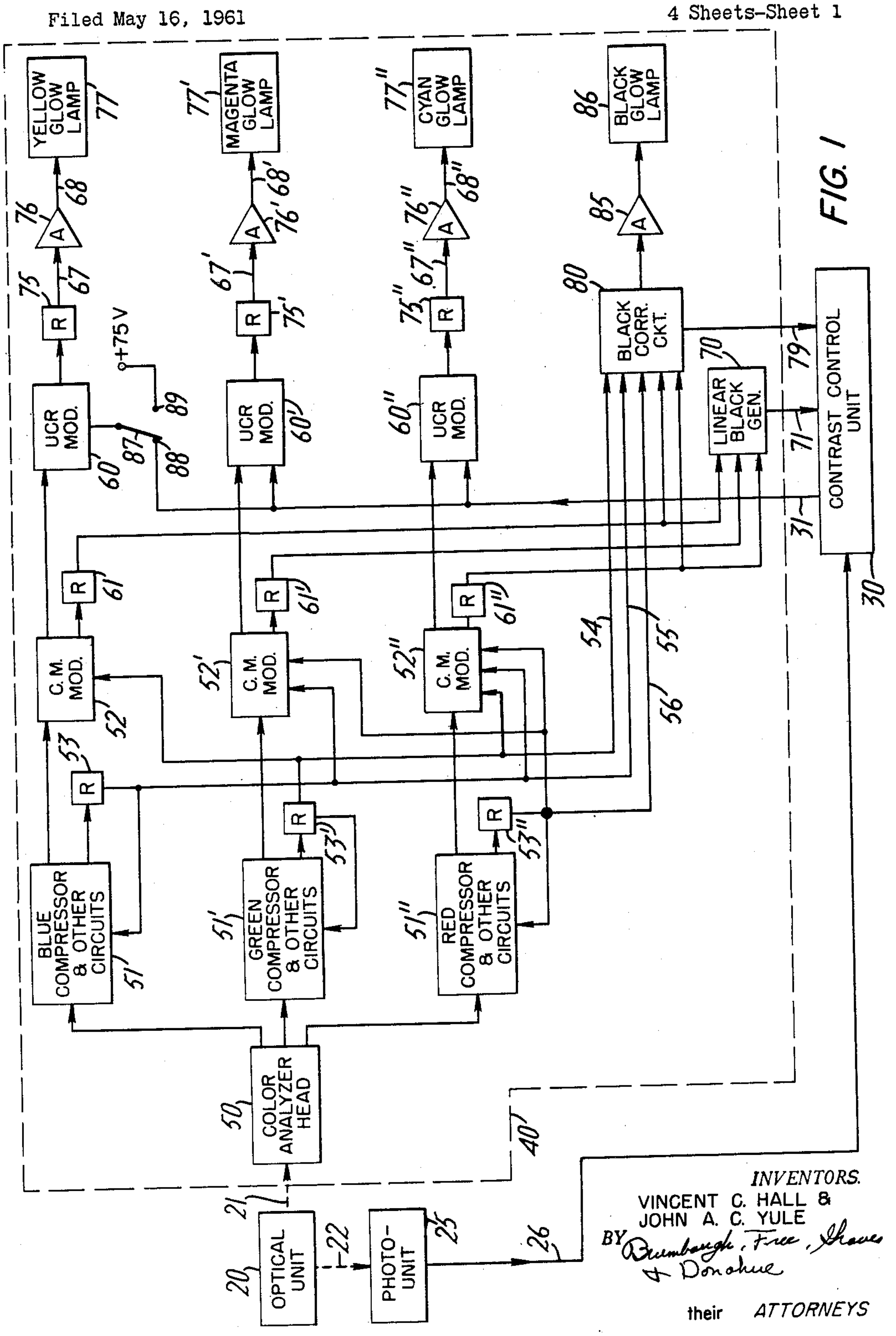
FIGURE 1 is a schematic diagram of a scanner system exemplifying the invention.
Figures 2, 8, 9, 10, 11:
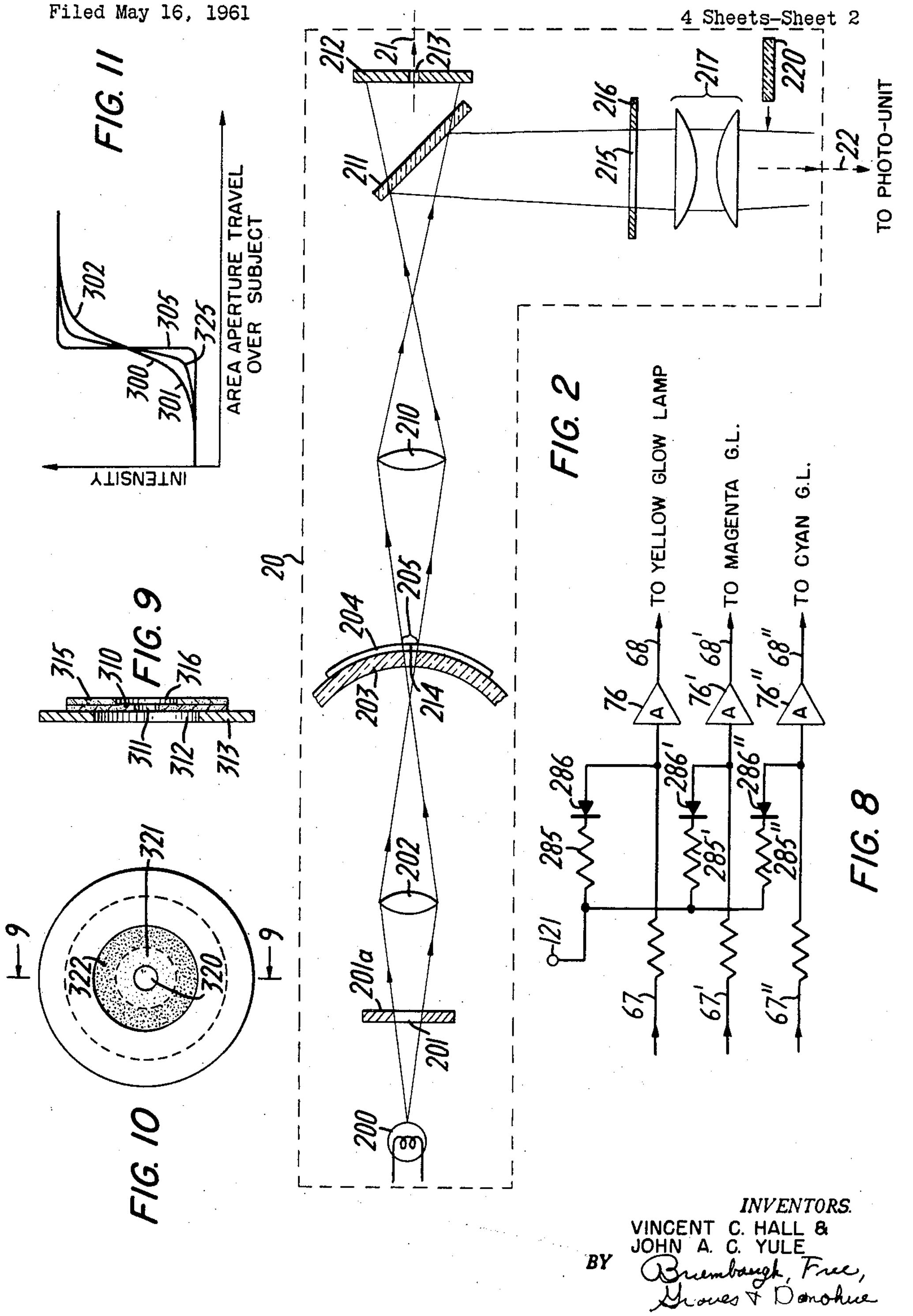
FIGURE 2 is a schematic diagram of the optical unit of the FIGURE 1 system.
Figure 3:
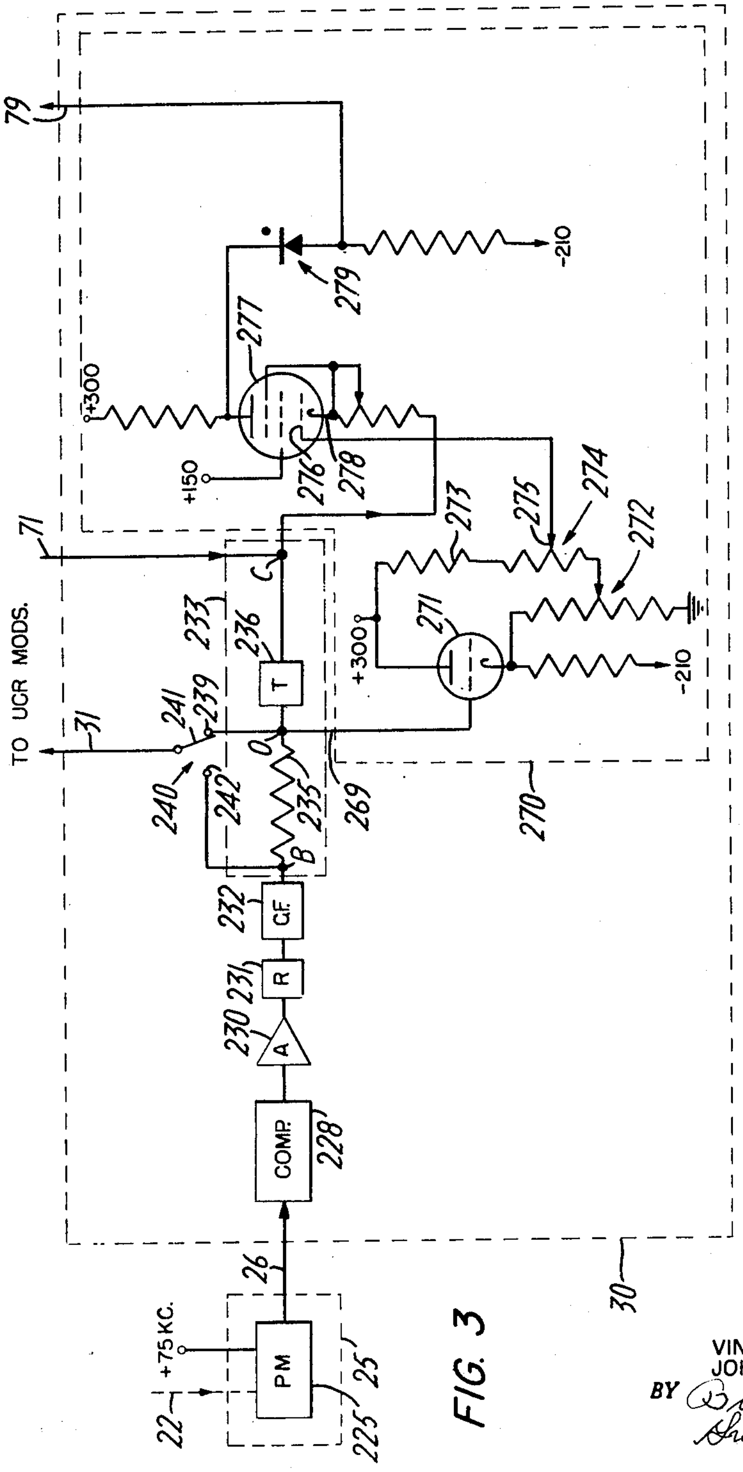
FIGURE 3 is a schematic diagram of the photo-unit and the contrast control unit of the FIGURE 1 system.
Figure 12:
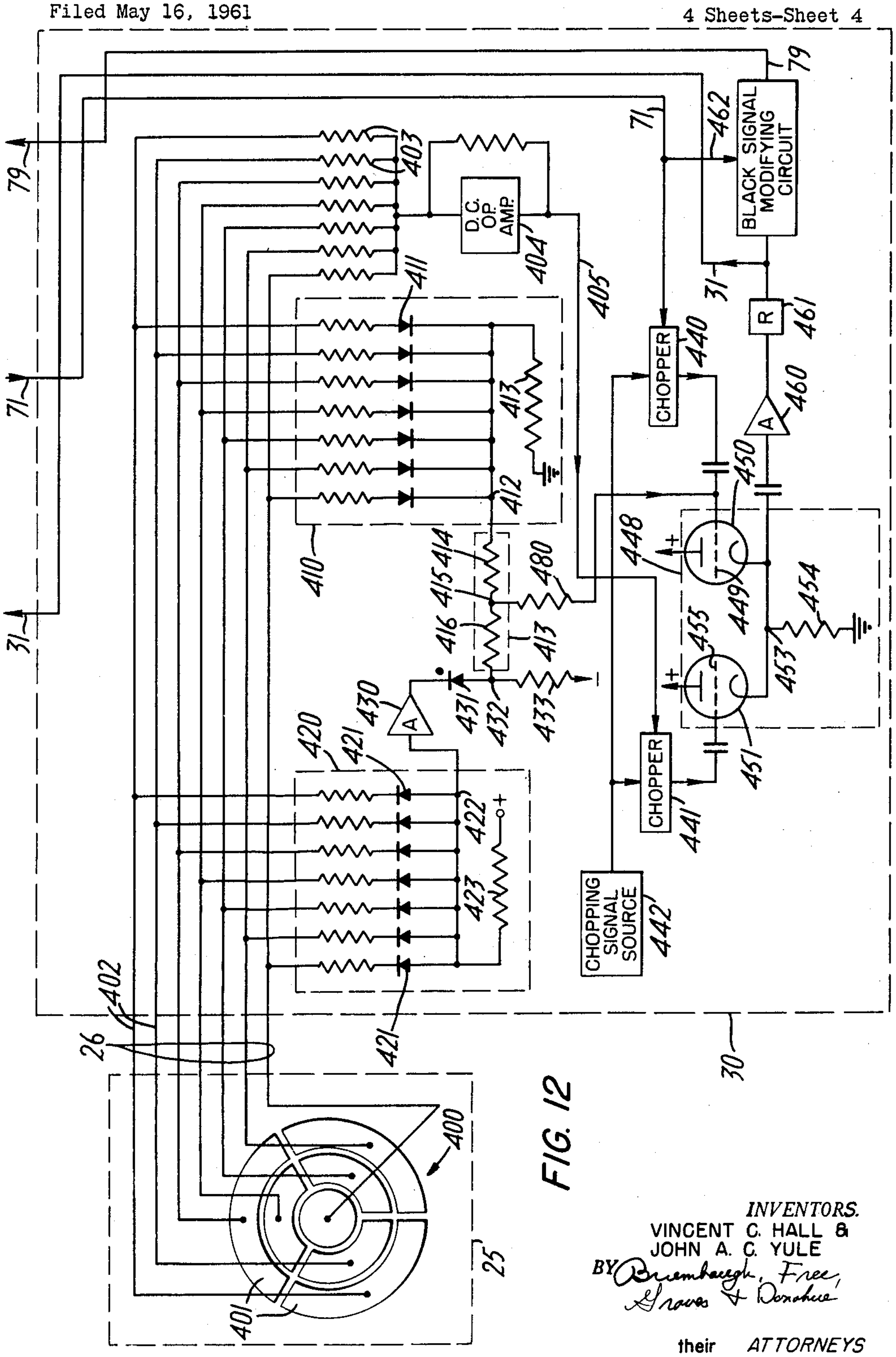

FIGURES 4–7 inclusive are diagrams explanatory of the operation of the FIGURE 1 system in different scanning situations;

FIGURE 8 is a schematic diagram of a color signal correction circuit for the system of FIGURE 1;

FIGURES 9 and 10 are, respectively, a side elevation in cross-section and a front elevation of aperture means adapted to be used in the mentioned optical unit of the FIGURE 1 system;

FIGURE 11 is a graph illustrating an effect of the aperture means shown in FIGURES 9 and 10; and FIGURE 12 is a schematic diagram of a photo-unit and a contrast control unit adapted to be used in the FIGURE 1 system in place of the photo-unit and contrast control unit shown in FIGURE 3.

Referring now to FIGURE 1, an optical unit 20 supplies a light beam 22 to a photo-unit 25 connected by an electrical conduit 26 to a contrast control unit 30. The same optical unit 20 supplies a light beam 21 to a color analyzer head 50 of a main scanner unit 40 which is generally the same as the scanner unit shown in FIG. 2 of U.S. Patent No. 2,947,805 issued on August 2, 1960, to Moe, and of which, accordingly, the details need not be described herein excepting for those by which the present main scanner unit 40 differs from that FIG. 2 unit of the patent. In the unit 40 and elsewhere in the drawings hereof, the elements designated "R" and "A" are rectifiers and amplifiers, respectively. As a further note, in the unit 40 of the present FIGURE 1 the elements designated "C. M. Mod." are color mask modulators corresponding to the modulators of the same name in the Moe FIG. 2 unit, and in unit 40 of the present FIGURE 1, the elements designated UCR Mod. are undercolor removal modulators corresponding to the so-called "black modulators" of the Moe FIG. 2 unit.

A minor difference between the present scanner unit 40 and the Moe FIG. 2 unit is that in the present one the "red" color mask modulator 52″ receives rectified blue, green and red color signals directly rather than through a maximum signal selector circuit. Some major differences are as follows.

First, in the present unit 40 the undercolor removal signal supplied (by lead 31) to the undercolor removal modulators 60, 60′, 60″ is a special signal derived (as later described) in unit 30 rather than being the "linear black" signal appearing on lead 71 and fed in the Moe unit directly to those modulators. In this connection, as taught in the mentioned Moe patent, the linear black signal is derived from and is representive in value of that one of the three scanner unit color signals which corresponds to the beam of greatest intensity among the blue, green and red light beams into which the color analyzer head 50 resolves the incoming light supplied by beam 21. Such greatest intensity beam corresponds in turn to the colored ink of least density deposited in the final ink print produced by the described facsimile system. For that reason, the linear black signal may also be termed the "least ink" signal, and, to avoid confusion, such terminology will be used except when such signal is employed in the black channel to be representative of the color "black," so as to be called appropriately the "linear black" signal.

As a second major difference of the present unit 40 from the Moe FIG. 2 unit, in the present unit the signal on lead 71 in its role as the "linear black" signal is modified (as later described) in the contrast control unit 30 before being supplied via lead 79 to the black correction circuit 80.

A third difference is that the undercolor removal input to blue undercolor removal modulator 60 may be selectively connected by switch 87–89 either to a fixed 75 volt supply or to the undercolor removal signal on lead 31.

Still another major difference will be discussed in connection with FIGURE 8.

The overall operation of the present scanner unit 40 is as follows. Light from a very small spot on a scanned original subject is transmitted via beam 21 to the head 50 which analyzes such light into three beams which are "blue," "green" and "red" in the sense taught in the mentioned Moe patent. Those three beams produce corresponding blue, green and red electric signals in separate blue (yellow), green (magenta) and red (cyan) channels of the scanner unit. In, say, the blue channel, the signal belonging thereto is compressed and subsequently modified by circuit 51, color-masked in circuit 52, subjected to undercolor removal in circuit 60, rectified, amplified and fed to a "yellow" glow lamp 77. The green and red color signals are likewise processed in their respective channels to be eventually fed to, respectively, the "magenta" and "cyan" glow lamps. The three glow lamps scan corresponding photo-sensitive film sheets in synchronism with the scanning of the original subject to expose respective images on those sheets. The sheets are then developed to produce yellow, magenta and cyan separation negatives, corresponding half tone plates are produced from such negatives, the three plates are inked with, respectively, yellow, magenta and cyan ink, and the ink images so produced on such plates are printed in superposition on a background sheet of white paper to form a colored print.

As explained more fully in the mentioned Moe patent, in a four-color system (such as that shown in the present FIGURE 1), the effect of the undercolor removal modulators on the inks deposited on the final print is to reduce the densities of the three colored inks from the densities such inks would have if three-color reproduction were used. For example, in the present system it has been found convenient for the undercolor removal modulators when giving full undercolor removal to remove from each of the three colored inks an amount of ink which, for the colored ink of least density value, is 60% of the amount of such ink which would be deposited in a three-color system. The 60% figure just given is merely one of convenience because the present invention is equally applicable for some other values of undercolor removal as, say, 100% undercolor removal when the undercolor removal modulators are adjusted to provide their full or maximum undercolor removal effect.

The reduction by undercolor removal of the densities of the colored inks deposited on the print is an effect equivalent to a compression of the reproduced tone density range supplementing the compression thereof produced by the exponential compressor circuits 51, 51′, 51″. In other words, the tendency of the undercolor removal modulators is to produce a decrease in the contrast appearing in the final print. The degree, however, to which such modulators produce such decrease in contrast depends upon the value of the undercolor removal signal, the relationship being that, as such signal increases, the undercolor removal effect diminishes, the densities of the deposited colored inks increase, and, therefore, there is an increase of the contrast seen in the print. An appreciation of the relationship just described is important to an understanding of the present invention. For this reason the connection between such relationship and the invention will be later described in considerable detail.

Referring now to FIGURE 2 which shows schematically the details of the optical unit 20, a light source 200 projects a beam of light through: (*a*) an aperture 201 formed in an aperture plate 201*a*; (*b*) a lens array 202 (represented in FIGURE 2 by a single lens); and (*c*) a transparent rotating scanning drum 203. The arrangement just described serves to focus an image of the aperture 201 on a color transparency (or other original subject) 204 mounted on the drum to thereby illuminate a circular area 205 or "auxiliary" spot of the transparency. While, for convenience of illustration, the elements 200–202 are shown as being disposed outside the drum in a plane normal to the axis thereof, in practice such elements are usually included in a periscope unit extending longitudinally of and inside the drum.

The aperture image focused on the transparency area 205 serves as a source of light for a beam which passes through a lens system 210 (represented in FIGURE 2 by a single objective lens) to fall on a partially silvered mirror 211 disposed at a 45° angle to the axis of the beam. About 90% of the light incident on mirror 211 is transmitted therethrough without reflection to fall on an aperture plate 212 having formed therein a very small "main" aperture 213. The light which passes through this aperture as beam 21 forms at the color analyzer head 50 (FIGURE 1) a focused image of a small circular "main" spot 214 disposed on transparency 204 concentric with the circular illuminated area 205. Such spot is the well-known scanning spot by which facsimile systems scan an original subject line by line to translate the tonal information therein into a time variation in amplitude of one or more electric signals.

The 10% of the light not transmitted through partially silvered mirror 211 is reflected thereby at an angle of 90° to the axis of the principal beam to be projected through an area mask or "auxiliary" aperture 215 formed in an aperture plate 216 at the focal plane of the lens system 210. Beyond the last named aperture, the light passes through a condensing lens system 217. The light which emerges from this system as beam 22 is supplied to photo-unit 25 (FIGURE 1) to form at that photo-unit a focused image of the illuminated area 205 of the transparency 204.

In the described optical system, the aperture 215 is called an area mask aperture for the reason that it is of an appropriate diameter to limit the area seen by photo-unit 25 to no more than the illuminated area 205 on transparency 204. The relation on that transparency between spot 214 seen by head 50 and area 205 seen by photo-unit 25 is shown in FIGURES 4–7 by the dotted line circles designated 205, 214 and defining the outlines of, respectively, that area and that spot. While, for convenience of illustration, the area 205 is shown as having a diameter only four or five times that of spot 214, in practice the area 205 is at least 20 times as great in diameter as spot 214, and, preferably, it is much greater. Thus, for example, good results have been obtained by the invention when the main spot aperture 213 is only 0.002 inch in diameter but when the area mask aperture is all of ⅛ inch in diameter, the diameters of the spot 214 seen by head 50 and the area 205 seen by unit 25 being in corresponding proportion.

As a further feature characteristic of the described optical system, the light source 200 and the photo-unit 25 are matched with each other in respect to the characteristic of spectral energy distribution with wavelength of the former and the characteristic of the photoelectric response with wavelength of the latter so that, to as good an approximation as can be obtained, throughout the visible wavelength range the electrical output of photo-unit 25 is ortholuminous, that is, the electrical output for each particular wavelength interval is proportional to the luminous sensitivity of the human eye to that wavelength interval. In other words, the approximation obtained is an approximation to the ideal electrical output which would be provided by photo-unit 25 over the visible wavelength range if the spectral energy output of light source 200 per unit wavelength interval were to be absolutely constant over such range, and if, also, the photoelectric response of unit 25 for each particular wavelength interval to such spectral energy output were to be proportional to the luminous response of the eye for the same wavelength interval. On occasion, a better approximation to a response which is ortholuminous can be obtained by inserting the shown color correction filter 220 into the light path between the source 200 and the photo-unit 25. As is evident, the effect of so obtaining a close approximation to such ortholuminous response is to render the electrical output from unit 25 representative only of variations in the luminous transmittance.

As shown in FIGURE 3, the photo-unit 25 may consist of a photomultiplier connected as disclosed in U.S. Patent No. 2,828,424 issued on March 25, 1958, to Moe to receive a 75 kc. signal and to convert intensity variations in the light incident thereon (from beam 22) into variations in amplitude of the modulation envelope of a modulated 150 kc. carrier. Because of the described ortholuminous response with wavelength conjointly obtained by the optical system and by the photomultiplier, such modulated carrier signal will be an average signal in the sense that the amplitude thereof at any time will represent the average intensity to the human eye for all wavelength values of the light seen at that time by the photomultiplier. Moreover, because the photomultiplier 225 is incapable of resolving the tonal detail, if any, in the transparency area 205 seen by it, such modulated carrier signal also represents the average tone density to the human eye for that entire area. Such signal will be termed herein simply the "area-masking" signal.

From photomultiplier 225, the area-masking signal is supplied by conduit 26 (in FIGURE 3, just a single lead) to an exponential compressor circuit 228 which may be a two stage compressor circuit employing D.C. feedback as disclosed in U.S. Patent No. 2,873,312, issued Feburary 10, 1959, to Moe. The compression characteristic of circuit 228 on the neutral scale can conveniently be matched with the compression characteristics in each of the color channels of the main scanner unit 40 (FIGURE 1) from the input of the compressor circuit of that channel to the output of the color mask modulator thereof. A consequence of this matching is that the area-masking signal has the same curve shape and range in the neutral scale as the least ink signal in lead 71 to thereby be matched in the neutral scale to that last named signal. If desired, however, the compression characteristic of 228 can be more or less mismatched with the mentioned compression characteristic of each color channel so as, by such mismatching, to give special tone scale effects.

From the compressor 288, the described average or "area" signal is amplified by a conventional amplifier 230, then rectified by a conventional rectifier 231 and finally passed through a conventional cathode follower stage 232 to a junction B at one end of a voltage divider circuit 233 consisting in series in the order named of the mentioned junction B, a linear resistor 235, an output junction O at the center of the voltage divider, a thyrite resistor 236, and an input junction C at the opposite end of the voltage divider circuit from input junction B. The last named junction C receives as an input signal the heretofore described least ink signal from the linear black generator 80 (FIGURE 1) of the main scanner unit 40. Thus, there is applied to the voltage divider circuit two input signals, namely the area-masking signal at junction B and the least ink signal at junction C.

The output from the voltage divider circuit signal 233 is supplied from output junction O to one fixed contact 239 of a switch 240 having a movable contact 241 connected to lead 31 and another fixed contact 242 connected to junction B. When the presently described system is used for four-color reproduction, the movable contact 241 is thrown to closed position with fixed contact 239 so that the signal from junction O is supplied as the undercolor removal signal via lead 31 to (FIGURE 1) the undercolor removal modulators 60, 60′, 60″ in the main scanner unit 40.

In the voltage divider circuit 233, the output at junction O is a composite of the simple area masking signal at junction B and the least ink signal at junction C, those two last named signals being relatively weighted in dependence on the relative resistance values of linear resistor 235 and thyrite resistor 236. Because such output is so a composite of the weighted area-masking and least ink signals, that output is termed herein the "composite area-masking" signal.

Now in connection with the matter of the weighting by circuit 233 of the area masking and least ink input signals, the thyrite resistor 236 is a non-linear resistor characterized by decreasing resistance as the voltage across it increases. Because of this non-linear property of resistor 236, as the voltage across the entire voltage divider circuit 233 increases either by an increase of the area-masking signal relative to the least ink signal or by an increase of the least ink signal relative to the area-masking signal, the weighting shifts in favor of the least ink signal so that the composite area-masking signal is comprised more and more of least ink signal and less and less of simple area-masking signal. In other words, the content of simple area-masking signal in the composite area-masking signal is at a maximum when the simple area-masking and least ink signals are equal and drops off from that maximum as a progressively increasing differential voltage of either polarity relative to junction B appears between junctions B and C across the voltage divider circuit.

For an understanding of how the disclosed system as so far described serves to improve contrast on a localized basis in the reproduced print, the operation of such system will be explained in conjunction with FIGURES 4–7 representing a number of different particular instantaneous situations which may be encountered in scanning an original subject such as the color transparency 204. To simplify such explanation, it will be assumed that, as is ordinarily preferable, the simple area-masking and least ink signals are, as described, matched to each other in curve shape and range in the neutral scale.

Figure 4:
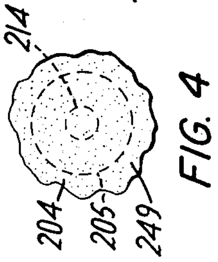

Considering FIGURE 4 first, there is depicted thereby a portion 249 (of transparency 204) which is homogeneous in tone and neutral in tone. For reasons well understood by the art, the simple area-masking and least ink signals derived from such a portion will be equal, the composite area-masking signal will be of the same value as the leak ink signal, and the undercolor removal effect will be exactly the same as if the least ink signal on lead 71 had been connected directly (as it is in Moe Patent No. 2,947,805) to the undercolor removal modulators 60, 60′, 60″. That is, when the illuminated area 205 of subject 204 is homogeneous in tone and neutral in tone there is obtained what will be defined herein as "standard undercolor removal."

Figure 5:
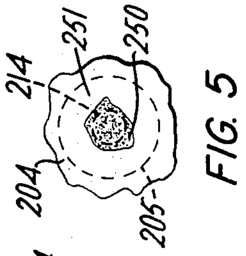

Turning now to FIGURE 5, in the scanning situation represented thereby the main spot 214 seen by head 50 (FIGURE 1) on transparency 204 is picking up a dark neutral detail or patch 250 surrounded by a lighter neutral field 251 filling the rest of the auxiliary spot or area 205 seen by the photomultiplier 225 (FIGURE 3). For convenience of explanation, it is assumed that the transmissivities of patch 250 and field 251 are such that the average transmissivity for the entire area 205 is the same in FIGURE 5 as in FIGURE 4 to produce the same value as before of area-masking signal at junction B. Such area-masking signal is greater in the FIGURE 5 situation than the low, least-ink signal developed at junction C from the scanning of dark patch 250 by the head 50. Hence, by the voltage-dividing action of circuit 233, the composite area-masking signal at O exceeds the least ink signal to provide an undercolor removal signal of greater value than if the least ink signal were used for undercolor removal. As stated previously, an increase in the undercolor removal signal produces a corresponding increase in the density of the inks deposited on the final print. It follows, therefore, that, when the composite area-masking signal is used in lieu of the least ink signal as the undercolor removal signal, the effect in the print on the color inks deposited to reproduce patch 250 is to increase the densities of such inks relative to the densities thereof which would be obtained for standard undercolor removal. In its turn, that relative increase in ink densities produces in the final print an increase or boost in the contrast of patch 250 and field 251 relative to the contrast therebetween which would be obtained when the undercolor removal is standard. Accordingly, for the dark-patch, light-field, neutral scale situation, the overall effect of the described system is to provide a boost in local contrast, i.e. the contrast between the localized detail (patch) and the non-localized field.

Figure 6:
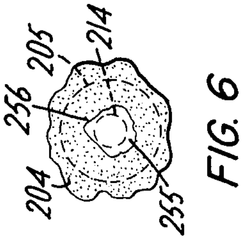

The scanning situation depicted by FIGURE 6 is the reverse of that shown in FIGURE 5 in that in the higher numbered figure the head 50 is picking up by spot 214 a light neutral local detail or patch 255 surrounded by a darker neutral field filling the rest of the area 205 seen by the photomultiplier 225. As before, it is assumed that the average transmissivity for the entire area 205 is the same as it is for the FIGURE 4 scanning situation. Hence, the area-masking signal at junction B will have the same value as before. The least ink signal at junction C will, however, now be greater than the area-masking signal. With a difference of voltage of this polarity between the signals at the junctions B and C, the circuit 233 acts to produce at junction O a composite area-masking undercolor removal signal of lesser value than the least ink signal. Therefore, as a result of the described relationship between the amplitude of the undercolor removal signal and the densities of the colored inks deposited on the final print, such inks as deposited to reproduce patch 255 will be reduced in the densities thereof relative to those densities which such inks would have with standard undercolor removal. The visible consequence of this relative reduction in colored ink densities is that the already lgiht patch 255 is further lightened relative to the tone it would have with standard undercolor removal so as to produce between lighter patch 255 and its surrounding darker field 256 a contrast which is boosted relative to the contrast therebetween obtained with standard undercolor removal. The described system, accordingly, acts in the FIGURE 6 situation as in the FIGURE 5 situation to increase local contrast, i.e. the contrast in the print between a reproduced local detail and a reproduced non-localized field surrounding such detail.

At this point, it is of interest to note that the voltage divider circuit 233 acts bidirectionally in the sense that, whether the local neutral detail is lighter or darker in tone than its surrounding neutral field, the circuit 233 automatically changes the amplitude of the undercolor removal signal in the direction appropriate to vary the densities of the colored inks reproducing the detail on the print in that direction which will increase the contrast between the detail and the field relative to the contrast therebetween which would obtain with standard undercolor removal.

Also, it should be emphasized that the described system boosts contrast on a local rather than a non-local or diffused area basis. To wit, assuming that area 205 and included spot 214 successively scan on transparency 204 two tone-contrasting neutral-tone portions which are each larger than area 205 and which are each entirely or relatively homogeneous in tone (like the portion 249 shown in FIG. 4), the system will not (excepting at the edge between those portions) substantially change the tonal value of either portion as reproduced relative to the tonal value of such reproduced portion which obtains when undercolor removal is controlled directly by the least ink signal as it is in Moe Patent No. 2,947,805. Therefore, considering such portions as non-local in the sense that they are larger than the area 205 used for contrast control purposes, for such non-local adjacent portions on the transparency, the described system obtains (excepting at the edge between such portions) what is called herein "standard" contrast. On the other hand, as described in connection with FIGURES 5 and 6, when there is on the transparency a neutral tone detail which is local in the sense that it is substantially smaller in size than area 205, and which is surrounded by a neutral tone field substantially larger than 205 and entirely or relatively homogeneous in tone, the described system does increase the contrast relative to standard between such detail and such field by changing in the appropriate direction the tone of the detail (but not of the field) relative to the tone which would be obtained for the detail in the instance where the least ink signal is the undercolor removal signal. Thus, it will be seen that in the sense in which the terms "non-local" and "local" are used herein, the described system provides non-local standard contrast but local boosted contrast.

Figure 7:
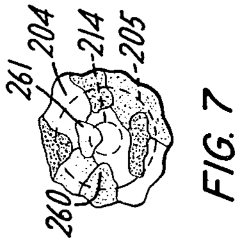

FIGURE 7 shows a scanning situation in which the area 205 includes a number of neutral-tone local details 260, 261, etc. In such scanning situation, the described system provides a boost in local contrast relative to standard in proportion to the difference between the transmissivity of transparency 204 through spot 214 and the average transmissivity of 204 through the large size area 205, such difference between the two transmissivities producing a contrast-boosting voltage difference between the area-masking and least ink signals at, respectively, the junctions B and C of the voltage divider circuit 233. Thus, for example, if there is included within area 205 a neutral tone checker-board pattern of which the squares are substantially smaller in dimension (e.g. ten times less) than the diameter of such area, the described system will provide locally a boost in contrast relative to standard by darkening and lightening (as reproduced) the tones of respectively, the darker and lighter squares of the pattern relative to the reproduced tone which those squares would have when undercolor removal is effected by the least ink signal.

Reverting to FIGURE 5, as the dark patch 250 gets progressively darker while the field 251 gets progressively lighter (to maintain the same as in FIG. 4 the average transmissivity through area 205 and, therefore, the amplitude of the area-masking signal at B), the amplitude of the least ink signal at C progressively decreases to thereby progressively increase the local contrast between the elements 250 and 251. Now, in that situation of increasing local contrast, if the resistor 236 were linear, the rate at which the composite area-masking, undercolor removal signal would rise above the least ink signal would be of linear character so that the local contrast boost in the reproduced print would be more or less linearly related to the amount of contrast in the original subject between patch 250 and field 251. It has been found, however, that, as the amount of contrast in the original subject increases, a linear boost in the contrast of the print has a tendency to produce an unsightly halo at the edge of the reproduced contrasting tonal areas.

This halo problem is overcome in the FIGURE 4 scanning situation by the non-linear resistance characteristic of the thyrite resistor 236. Specifically, as the least ink signal at C progressively decreases in value relative to the area-masking signal at B, the resistance of 236 also progressively decreases to produce a corresponding decrease in the voltage between O and C expressed as a percentage of the voltage between B and C. In other words, as the least ink signal progressively decreases, the rate at which the undercolor removal signal at O rises above the least ink signal is a rate which progressively diminishes to thereby produce a "backing-off" of the local contrast boost for the reproduced subject as the contrast in the original subject progressively increases. Such backing-off of the local contrast boost has been found to reduce greatly the halos which would otherwise be produced in the print.

While the use of thyrite resistor 236 for backing-off local contrast boost has been discussed in connection with FIGURE 5, such resistor will act similarly in the FIGURE 6 scanning situation wherein, for increasing local contrast in the original subject, the least ink signal at C will progressively increase relative to the area-masking signal at B, but wherein the thyrite resistor will, as before, respond to the increasing voltage across it to decrease in resistance to thereby back-off the local contrast boost by progressively reducing the voltage difference between the lower voltage undercolor removal signal at O and the higher voltage least ink signal at C (such voltage difference being expressed as a percentage of the voltage between B and C). Thus, both in the situation where in the original subject the local detail in spot 214 is dark relative to the surrounding field, and where in such subject that detail is light relative to the surrounding field, as the amount of contrast in the original subject between the detail and the field progressively increases, local contrast boost is backed-off by the composite area-masking signal approaching closer and closer in value to the least ink signal so as to provide in the print a local contrast which approaches closer and closer to standard contrast. Note in this connection that the circuit 233 is again bidirectionally acting in that it backs-off the local contrast boost when the least ink signal at C either progressively increases or decreases relative to the area-masking signal at B.

In four-color reproduction, it is desirable for the amounts removed from the three colored inks by undercolor removal to have a predetermined quantitative relation to the amount of black ink deposited on the print. Such relationship is obtained in the system of Moe Patent No. 2,947,805 by virtue of the fact that the same signal (the least ink signal) controls the undercolor removal and, also, provides the "linear black" signal which controls the deposition of black ink. In the present system, however, the composite area-masking signal which controls undercolor removal is, as described, variable in relation to the least ink signal employed as the "linear black" signal. Therefore, absent any provision for the contrary, in the present system the relation between undercolor removal and black ink deposition would likewise be variable. To reduce or substantially eliminate such variability, in the present system the technique is employed of modifying the linear black signal by the composite area-masking signal in a manner to reestablish the mentioned desired predetermined quantitative relationship. This is done by means as follows.

Referring again to FIGURE 3, the composite area-masking signal is supplied from junction O by lead 269 through one input for a black signal modifying circuit 270 to the grid of a cathode follower triode 271. At the output of tube 271, such signal is applied to a potentiometer 272 used to adjust the percentage of composite area-masking signal employed to modify the black signal. From the output of 272, the discussed signal is fed to a series network of a resistor 273 and a potentiometer 274 having a tap 275 connected to the grid of a pentode 277, the tap being adjustable over the length of potentiometer 274 to thereby adjust the D.C. bias on grid 276.

Another input for the black signal modifying circuit 270 is provided by the least ink signal which is supplied as the linear black signal from the lead 71 to the cathode 278 of pentode 277. Within the pentode, the linear black signal is modulated in amplitude by the composite area-masking signal so that, at the pentode output, the black signal undergoes a variation in amplitude attributable to the composite area-masking signal and having the same direction of variation as the amplitude variation of that last named signal. Following its appearance at the pentode output, the black signal as so modified in amplitude is reduced in level by a Zener diode 279 and, thereafter, is supplied by lead 79 to the black correction circuit 80 (FIGURE 1).

Hitherto, the operation of the disclosed system has been described only for situations in which neutral tone portions of the transparency are being scanned. When those portions are colored, the operation of the disclosed system is the same as previously set forth subject to one difference as follows. Because of the effectively flat electrical response with wavelength of the photomultiplier 225, despite the fact that the transparency portion included within area 205 is colored, the area-masking signal at junction B is representative in value of the average transmissivity in the neutral scale of such portion. On the other hand, the least ink signal at junction C is (as well understood by the art) representative in value of that one of the primary additive blue, green and red color components which is maximum within the transparency portion included within the main spot 214. Therefore, when the colored transparency portion included within area 205 is undetailed (so that the respective portions within area 205 and spot 214 are identical in color tone), the least ink signal at junction C is ordinarily greater than the area-masking signal at junction B, the undercolor removal signal at O is, therefore, ordinarily less than the least ink signal and (in accordance with the stated relationship that the density of the colored ink deposited on the print varies directly with the amplitude of the undercolor removal signal), the result is that, in the reproduced undetailed portions (excepting at the edges thereof), the colored inks are ordinarily reduced in density below the density they would have if the least ink signal were used as the undercolor removal signal. In this connection, it would perhaps be more accurate to say that the colored inks are almost invariably so reduced in the reproduced undetailed portions (excepting at the edges thereof) because, even when the tone of such a portion is near 100% purity (e.g. is a near saturation blue or green or red), the effect of the color mask modulators is to produce at junction C a least ink signal of higher value than the area-maskink signal at junction B.

Such reduction in the colored ink densities in the undetailed reproduced color portions is undesirable because, visually speaking, it produces a "washing-out" of the color seen in the print. Of course, for transparency portions having contrasting colored tonal details small in size relative to the area 205, such washing-out effect cannot be said to be present in a detractive sense because (by the previously described local contrast boosting action) the relatively darker reproduced color details are heightened in tone density (the opposite of washing-out) and, in respect to the relatively lighter reproduced color details, although they are reduced in tone density (by such local contrast boosting action), such reduction serves the primarily desired end of augmenting the local contrast.

The described washing-out of color in the undetailed reproduced colored portions of the subject may be minimized in the disclosed system by employing the circuit shown in FIGURE 8. That circuit has a terminal 121 corresponding to the junction 121 shown in FIG. 3 of Moe Patent No. 2,947,805. At such terminal 121 there appears an ortholuminous signal which is representative in value of the integrated visual brightness to the human eye of the color of the transparency portion within spot 214. Such ortholuminous signal is formed by combing 5%, 75% and 20% of, respectively, the blue, green and red color signals developed in the main scanner unit 40 ahead of the color mask modulators.

In the FIGURE 8 circuit, the ortholuminous signal at terminal 21 is supplied to each of the blue, green and red D.C. amplifiers 76, 76′, 76″ through a series combination respective to each such amplifier of a resistor and of a rectifier diode connected to oppose the flow of current from the amplifier input towards the terminal. Thus, for example, terminal 121 is connected to the input of blue amplifier 76 through the series combination formed of the resistor 285 and the diode 286. The three mentioned amplifiers 76, 76′, 76″ also receive from, respectively, the leads 67, 67′, 67″ the blue, green and red primary additive color signals. When in any color channel the primary additive color signal is less than the ortholuminous signal, nothing happens because the diode interposed between terminal 121 and the input of the D.C. amplifier for that channel is an element precluding flow of current from that terminal to that input. When, however, in such channel the primary additive color signal at the input to the D.C. amplifier exceeds the ortholuminous signal at terminal 121, the diode conducts to reduce the voltage at the amplifier input of the color signal. As is well understood, such reduction in the mentioned color signal is equivalent to an increase in the density of the colored ink deposited as a function of that signal. Therefore, the FIGURE 8 circuit serves to compensate for the color washing-out effect which would be produced in the absence of such circuit.

Another factor compensating for the described washing-out effect is the thyrite resistor 236. To wit, when, due to the character of the color tone of an undetailed transparency portion appearing in area 205, the least ink signal at C becomes excessively high relative to the area-masking signal at B, the thyrite resistor responds to the increased voltage across it to decrease in resistance to thereby shift the voltage at O of the composite area-masking signal towards the voltage value of the least ink signal. In other words, in the situation described, the decreasing resistance of the thyrite resistor serves to increase the voltage of the composite area-masking signal. As previously set out, an increase in such signal effects an increase in the densities of the colored inks deposited on the final print and, therefore, compensation for the described washing-out effect.

While the described system is intended primarily for four color reproduction, it can be adapted for three-color reproduction in a manner as follows. First, referring to FIGURE 1, the movable contact 87 (connected to the modulation input of undercolor removal modulator 60) is thrown from its closed position with fixed contact 88 (used for four-color reproduction) to a closed position with fixed contact 89 so as to produce zero undercolor removal in modulator 60. Next, referring to FIGURE 2, a red filter 220 is inserted beyond lens system 217 into the light path between light source 200 and photo-unit 25 (FIGURE 3). Such filter is a No. 29 red filter similar to the one used in the color analyzer head 50 for deriving the red light beam from the unresolved beam 21.

As another adjustment for three-color reproduction, in the contrast control unit 30 (FIGURE 3) the movable contact 241 is thrown from closure with fixed contact 239 to closure with fixed contact 242 so that the simple area-masking signal at junction B rather than the composite area-masking signal as junction O provides the undercolor removal signal fed to the green and red UCR modulators 60′ and 60″. Finally, in the main scanner unit 40 (FIGURE 1) the color mask modulators are adjusted to reduce their effective compression so as to compensate for the compression effected in the undercolor removal modulators. With the described adjustments being made, appropriate three-color local contrast boosting is obtained when the undercolor removal signal from junction B so masks the green and red UCR modulators that the color correction is the same as that formerly attained by the color mask modulators in the green and red color channels. Of course, for such three-color reproduction, the black channel is not used.

There will next be considered the hitherto undiscussed topic of the effect provided by the described local contrast boosting action on an edge existing on the scanned transparency between two tone-contrasting undetailed neutral-tone portions each larger in both dimensions than the area 205. Assume that such an edge on the transparency is traversed by the area 205 and spot 214 moving in a direction from the darker to the lighter portion, and assume, furthermore, that the area-mask aperture 215 is the plain aperture shown in FIGURE 2. As will be clear from the teaching of Moe, U.S. Patent No. 2,865,984 (in connection with FIGS. 5 and 6*b* of that patent), when area 205 crosses such edge, the voltage of the area-masking signal at junction B will rise from an initial lower level to a final higher level in the manner represented by curve 300 in FIGURE 11 hereof.. As shown, such a curve is characterized by a knee 301 at its beginning and by another knee 302 at its end.

While the area-masking signal is so rising, the voltage of the least ink signal at junction C varies in a manner represented in FIGURE 11 by the curve 305. The voltage difference between those area-masking and least ink signals is represented in that figure by the difference in the vertical ordinate between the curves 305 and 300.

Now, as is evident from the description hitherto given, before spot 214 crosses the edge, that voltage difference will be of a polarity to increase the undercolor removal signal (at junction O) relative to the least ink signal so as, in the vicinity of the edge, to increase in the final print the tone density of the reproduced darker portion. On the other hand, after spot 214 crosses the edge, the mentioned voltage difference will be of a polarity to decrease the undercolor removal signal relative to the least ink signal so as, in the vicinity of the edge, to decrease in the final print the tone density of the reproduced lighter portion. Thus, as shown in FIGURE 7 of the mentioned Patent No. 2,865,984, in the print the edge will be bordered on its darker and lighter sides by, respectively, a zone of increased tone density relative to that of the darker portion and a zone of decreased tone density relative to that of the lighter portion. Within each such zone, the variation in tone density across the width of the zone is (subject to the contrast backing-off effect of thyrite resistor 236) roughly proportional to the vertical displacement in FIGURE 11 of the curve 300 from the curve 305.

In FIG. 7 of the last-named Moe patent, the widths of the shown tone density zones are less than the diameter of the main spot so as not to be visibly apparent excepting that, subliminally, they provide an impression of edge sharpness.

In the present system where the area 205 is of large enough diameter to be easily seen, and where each tone density zone has a width of about half of that diameter, such tone density zones are easily and unpleasantly distinguishable by the human eye from the undetailed transparency portions on which they are superposed unless within each zone there is a gradual transition in tone density from the margin of the zone away from the edge to the margin of the zone adjacent such edge. As shown in FIGURE 11, when the aperture 215 of FIGURE 2 is used, such gradual transition is not obtained.

It has been found that an improved transition of tone density across each zone from its outer to its edge-adjacent margin can be obtained by employing in place of the plain aperture 215 (FIGURE 2) an aperture provided by the structure shown in FIGURES 9 and 10. In that structure, a first annular ring 310 of transparent developed photographic film has a central circular hole 311 smaller than the central circular hole 312 in an adjacent annular plate 313 on which the film ring 310 is mounted in concentric relation. A second annular ring 315 of transparent developed photographic film is mounted on and in concentric relation with the film ring 310. This second film ring has formed therein a central hole 316 of larger diameter than the hole 311 in film ring 310 but of smaller diameter than the hole 312 in plate 313. Each of the film rings 310 and 315 is processed to have thereon a light neutral tone. Accordingly, looking through the aperture defined by the hole 310 in plate 313 and provided by the described structure, what will be seen (FIGURE 10) is (*a*) a central circular area 320 corresponding to hole 311 and having full transmissivity, (*b*) a first ring 321 of lesser transmissivity surrounding area 320, and (*c*) a third ring 322 of still lesser transmissivity surrounding the ring 321. In other words, the aperture provided by the FIGURES 9 and 10 structure is of a sort characterized by a progressively decreasing transmissivity from the center radially outward to the circumferential margin of the aperture. With such an aperture substituted in place of the plain aperture 215, it has been found that, as the area 205 crosses the described edge, the rise in voltage of the area-masking signal at junction B is more closely representable by the curve 325 in FIGURE 11 than by the curve 300. Evidently, such a curve 325 for the area-masking voltage will render less visible the mentioned tone density zones than will the curve 300 obtained for the area-masking voltage when a plain aperture is used.

The described variation in the transmissivity of the aperture need not be a step-by-step variation, but, instead may be a continuous linear or non-linear variation outward from the center of the aperture or from a circular zone concentric with such center. Moreover, whether a step-by-step or continuous variation in transmissivity is desired, either may be obtained by exposing the desired transmissivity pattern as a tone density pattern on a single piece of transparent photographic film, and by substituting such film piece for the two film pieces used in the FIGURE 9 structure. Instead of substituting a variable transmissivity aperture of the sort described for the plain area-masking aperture 215, such a variable transmissivity aperture may be substituted for the plain illumination aperture 201 (FIGURE 2), and to do so provides the additional advantage of reduction in the flare from area 205 seen by the head 50 through the aperture 213. Moreover, an aperture having the described variable transmissivity characteristic can be used in place of aperture 201 and another such variable transmissivity aperture can simultaneously be used in place of aperture 215 to further improve for viewing purposes the tone density transition across the described tone density zones.

Referring back to FIGURE 7, it will be recalled that, in connection with that figure, it was pointed out that a local contrast boosting action would be provided by the described system in the presence within area 205 of a neutral tone checker-board pattern of which the squares are considerably less in dimension than the diameter of such area. Now, when the contrast in the pattern is great as, say, when the squares thereof are black and white, the contrast boosting action departs from ideal because of the following. Assuming for such black and white pattern that the spot 214 is centered in a black square, the head 50 sees only black and, as it should be, the least ink signal at junction C is at minimum value. The photomultiplier 225, however, sees all of the black and white squares in area 205, and, because such photomultiplier is incapable of resolving tonal details viewed thereby, it interprets the light incident thereon as being derived from a grey tone intermediate black and white. Thus, the system as so far described is unable to distinguish the assumed scanning situation presented by the black and white checker-board pattern from the scanning situation of FIGURE 5 when patch 250 is black and field 251 is intermediate grey. Likewise, in the case of the black and white checker-board pattern, when spot 214 is centered in a white square so that head 50 sees all white, the system as so far described is unable to distinguish the scanning situation thereby presented from the scanning situation of FIGURE 6 when patch 255 is white and field 256 is intermediate grey. Evidently, however, the amount of local contrast boosting which is ideal for the black and white checker-board pattern will be somewhat different than the amount of local contrast boosting which is ideal for the FIGURE 5 and FIGURE 6 scanning situations which have just been described. What is needed, therefore, is some means for correcting the local contrast boosting action as both a function of the average transmissivity (density) of area 205 and as a function of a measure of the maximum local contrast between local tonal details in area 205.

A means of such sort is incorporated in the sub-system which is shown in FIGURE 12, and which is usable in the described overall system in place of the sub-system shown in FIGURE 3. In the FIGURE 12 sub-system, the photo-unit 25 is comprised of a circular mosaic 400 of small photocells 401 which may be, say, photoconductive transistors, and which consist of a central photocell and other photocells arranged in rings and sectors around the central one. Each such photocell views a respective portion of area 205 so that in combination the photocells vies substantially all of that area. While, for convenience of illustration, only seven photocells are shown, in practice it is desirable to use a great many more. If desired the shown photocells may be decreased in photoelectric sensitivity with displacement thereof outward from the center of the mosaic, the purpose being to compensate for the increase in area of the photocells with outward displacement. Alternatively, the photocells may all be of the same area and photoelectric sensitivity, and the number of photocells per ring thereof increased as the rings get radially larger.

The photocells of mosaic 400 provide separate electrical outputs $D_1, D_2 \ldots D_n$ which correspond to the tone densities of the respective portions viewed by those photocells on the expanse of transparency 204 included within area 205, and of which one electrical output is the $D_{max.}$ output (corresponding to that one of the viewed portions of greatest tone density) and another output is the $D_{min.}$ output (corresponding to that one of the viewed portions which is of minimum tone density).

The separate electrical outputs of photocells 401 are supplied by respective electrical leads 402 (together forming conduit 26) to the contrast control unit 30 and, within that unit, through isolating resistors 403 to the input of a D.C. operational amplifier 404. As is well known, such amplifier provides an accurate summing action so as, in this instance, to produce on its output lead 405 a signal of a value $1/n\ (D_1+D_2+\ldots D_n)$. It will be recognized that such a signal represents the average tone density of the expanse of transparency 204 within area 205. Hence, that signal is equivalent to the heretofore described "area-masking" signal and will be called as before the area-masking signal.

The separate photocell signals $D_1$ etc. are also supplied in unit 30 to a maximum signal selector circuit 410. Within this circuit a plurality of diodes 411 each has its cathode connected to a common junction 412 and its anode connected (through a current limiting resistor) to receive a respective one of the photocell signals. The junction 412 is connected to ground through a high resistance 413. Such circuit operates in a well-known manner to develop on junction 412 a voltage representative only of the $D_{max.}$ signal. The $D_{max.}$ signal on junction 412 is supplied as an input to an algebraic summing circuit 413 comprised in series in the order named of a resistor 414, a center junction 415 and another resistor 416 equal in resistance value to 414.

The signals $D_1$ etc. are still further supplied in unit 30 to a minimum signal selector circuit 420 within which a plurality of diodes 421 are connected in reverse relation to those of the circuit 410 in that in 420 the diodes have their anodes connected to a junction 422 common thereto and their cathodes connected so that each receives (through a current limiting resistor) a respective one of the photocell signals $D_1$ etc. The common junction 422 is connected through a high resistance 423 to a positive voltage supply providing a voltage greater than the maximum voltage for the photocell signals. From this voltage supply, current flows through high resistance 423 and through the diode connected to the $D_{min.}$ photocell signal to produce at a junction 422 a positive $D_{min.}$ voltage. Since this $D_{min.}$ voltage, although positive, is less than all of the other positive voltage photocell signals, a reverse bias is applied to all of the diodes 421 excepting for the one thereof receiving the $D_{min.}$ signal. Accordingly, all of the photocell signals except for $D_{min.}$ are locked out from appearing at junction 422, and, in this way, the circuit 420 acts as a selector of the $D_{min.}$ photocell signal.

The $D_{min.}$ signal at junction 422 is passed through a D.C. amplifier 430 having an inverting action so that, at its output, the variations in amplitude of the $D_{min.}$ signal are opposite in direction to the amplitude variations thereof at the input to the amplifier. From such amplifier output, the $D_{min.}$ signal is fed to a Zener diode 431 connected through a junction 432 and a resistor 433 to a negative voltage supply. The parameters of the Zener diode circuit are such that the junction 432 is at ground when the $D_{min.}$ signal at junction 422 has zero value. Hence, at junction 432 the $D_{min.}$ signal is manifested as negative voltage variations relative to ground. Such $D_{min.}$ signal is supplied from junction 432 as an input to the algebraic summing circuit 413 at the end thereof opposite to that at which the $D_{max.}$ signal is applied to the circuit.

Since the circuit 413 is an algebraic summing circuit, and since the input $D_{max.}$ and $D_{min.}$ signals to that circuit are of positive and negative polarity, respectively, the circuit 413 develops as an output at its junction 415 a voltage signal which is representative in value of the quantity $D_{max.}-D_{min.}$, such signal being termed herein the "area contrast" signal. Evidently that signal is a measure of the maximum contrast existing between (not necessarily adjacent) local tone density details in the expanse of transparency 204 included within the area 205.

Bypassing temporarily the matter of how the area contrast signal is used, as stated, there is developed in the FIG. 12 sub-system on the lead 405 an area-masking signal equivalent to the signal of the same name discussed in connection with FIGURE 3. The FIGURE 12 sub-system also receives by lead 71 the heretofore discussed least ink signal. Those least ink and area-masking signals are supplied to, respectively first and second chopping circuits 440 and 441 connected to a common signal source 442 to receive a common chopping signal therefrom. Within those chopping circuits, the input D.C. least ink and area-masking signals are converted in a well-known manner into alternating current signals of the same phase and frequency.

The alternating current least ink signal at the output of chopper 440 is fed as an input to a weighting circuit 448 and, within that circuit, to the grid 449 of a triode 450 paired with a similar triode 451 in the sense that the cathodes of both triodes are connected through a common junction 453 and a common resistor 454 to ground. The alternating current area-masking signal at the output of chopper 441 is applied to the grid 455 of triode 451 to provide the second input for the weighting circuit. The well-known action of such circuit is to provide at its junction 453 an output voltage signal which is a composite of the two input signals to the circuit. Additionally, the circuit 448 weights such two input signals as they affect the output signal so that, as a first of such input signals progressively increases relative to the second thereof, the ratio of first to second signal in the composite output signal becomes progressively greater than the ratio of first to second signal at the inputs to the weighting circuit.

Thus, it will be seen that, as so far described, the circuit 448 has an action which is similar to that of the already discussed voltage divider circuit 233 of FIGURE 3 excepting for the difference that, when the area-masking signal progressively increases relative to the least ink signal, the circuit 448 does not, as so far described, provide the mentioned backing-off effect produced by the thyrite resistor 236 in circuit 233. Because of this similarity in action of the circuits 233 and 448, the output signal of the latter can be considered the equivalent of the output signal from the former, and, because of that equivalency, the output of 448 like the output of 233 is referred to herein as the "composite area-masking" signal.

Such composite area masking signal at the junction 453 of circuit 448 is fed from that junction through an A.C. amplifier 460 and a rectifier 461 to be supplied from the output of that rectifier to the already described lead 31. Furthermore, the mentioned signal is supplied from the rectifier output to the already described black signal modifying circuit 80. That last named circuit receives from leads 71 via lead 462 an input of the linear black signal, and the circuit 80 operates as before described to supply a modified black signal to the heretobefore mentioned lead 79.

From the above description of the FIGURE 12 sub-system, it is evident that such sub-system provides local contrast boosting in much the same manner as does the FIGURE 3 sub-system excepting for the heretofore mentioned difference that, as so far described, the FIGURE 12 sub-system is not characterized by a backing-off of the progressive increase in local boosting of contrast (relative to standard contrast) occurring where the area-masking signal progressively increases relative to the least ink signal. Such backing-off effect, is, however, provided in a manner as follows by the area contrast signal developed at junction 415.

In FIGURE 12, the D.C. area contrast signal is fed from junction 415 through resistor 480 to the grid 449 of triode 450 to vary the plate-cathode trans-conductance of that tube in the same direction as the variation in amplitude of the signal. That is, as the area contrast signal increases, the trans-conductance of tube 450 likewise increases and, conversely, as the signal decreases, the tube transconductance likewise decreases. As is well known, such an increase and decrease in the transconductance of tube 450 produce, respectively, a corresponding increase and decrease in the gain provided by the tube for the alternating current least ink signal applied to the grid 449 of the tube.

Assume now as a scanning situation that the spot 214 is in the center of a black patch on transparency 204, that the expanse of 204 within area 205 is characterized by a high value for the contrast between two local neutral tone details present within area 205 and which, among all such details, have the greatest difference in tone density, and that the average tone density over the entire area 205 is a neutral tone density close to white. In that situation, the area-masking signal will be high relative to the least ink signal, wherefore, for the reasons already described, in the absence of any backing-off of contrast, the composite area-masking signal developed by circuit 448 would cause in the final print a heightening of contrast between the mentioned patch and its surroundings of a value sufficient to tend to produce an undesired halo at the margin of the patch. Consider now, however, the effect in circuit 448 of the area contrast signal. Because, in the assumed situation, the contrast between the mentioned two local details within area 205 is a high one, the area contrast signal similarly has a high value. That high value produces a higher than normal gain for amplifier tube 450 to thereby boost the ampltiude of the A.C. least ink signal applied to the junction 453. Because of such boosting of the least ink signal, and because of the described signal weighting action of the circuit 448, the ratio of least ink signal to area-masking signal in the composite area-masking signal at junction 453 increases in value such that the value of the composite area-masking signal shifts toward that of the least ink signal. As previously indicated, however, such a shift produces in the print a backing-off of the boosting of the local contrast in the sense that the reproduced contrast approaches closer to what has been defined herein as "standard contrast."

In the neutral scanning situation which is opposite to the one just described in the sense that spot 214 is now assumed as centered in a white patch on the transparency and in that the average tone density over the entire area 205 is now assumed as close to black, but which is the same as the earlier described situation in the respect that, once again, the expanse of 204 within 205 is assumed as characterized by high contrast between two local tonal details present in the area and which, among all such details, have the greatest difference in tone density, for reasons which should be evident from the above description, the area contrast signal again provides the desired backing-off of the contrast boost. Moreover, in the case of the discussed black and white checker-board pattern, a similar backing-off of the contrast boost is produced by the area contrast signal. Hence, the FIGURE 12 sub-system is well adapted to reduce or eliminate in the final print the haloes which would result if such backing-off of contrast boost were to not take place.

Instead of obtaining electronically the described increase on a local basis of the contrast in the print, such localized increase in contrast may be obtained photographically as follows:

Starting with a photographic negative, a positive with a gamma of one is made as in the Kodak Toneline process. The negative and positive, separated by a thick spacer, are printed onto Contrast Process Ortho Film, through a diffusion sheet. A second exposure is made, on the same film, with the order of the negative and positive reversed. The resulting film, after processing, is a record of the contrast of various parts of the picture. A print is made from it on Contrast Process Ortho Film, and this print will be low in density in the contrast of such parts of the picture. The last two images are registered successively with the original negative while a print is made from it on Kodak Polycontrast Paper with magenta and yellow filters for the two exposures. The said parts of the picture will then be reproduced at a lower contrast. An area mask of the usual type should be used in addition.

It is to be understood in connection with the above disclosure that the circuits of FIGURES 3 and 8, the structure of FIGURES 9 and 10 and the structures described herein as equivalent thereto, and, also, the operational features of FIGURE 11 are all items which are not a part of the present invention, and which are disclosed herein only for the purpose of providing a better understanding of the present invention.

For further information helpful in providing a background for understanding the invention hereof, reference is made to the following U.S. patents: Moe, 2,829,313; Ross, 2,877,424; Hall, 2,892,016; Yule, 2,932,691; and Hall, 2,744,950.

The above-described embodiments being exemplary only, it will be understood that additions thereto, omissions therefrom and modifications thereof can be made without departing from the the spirit of the invention, and that the invention hereof comprehends embodiments differing in form and/or detail from those which have been specifically disclosed. Accordingly, the invention is not to be considered as limited save as is consonant with the recitals of the following claims.

We claim:

1. A facsimile method for producing a replica of an original tonal subject comprising, deriving from a small spot on said subject a first electric signal representative of tonal information contained within said spot, deriving from an area on said subject surrounding said spot a second electric signal representative of the average tone density of said area, deriving from said area a third electric signal representative of a contrast condition therein, and modifying said first signal as a function of both said second and third signals in a manner to produce adjusted localized contrast in a replica of said subject produced from said first signal.

2. The method as in claim 1 in which said second and third signals are both derived from a common emanation of light from said area.

3. The method as in claim 1 in which said method is a color reproduction method.

4. A facsimile method for producing a replica of an original tonal subject comprising, deriving from a small spot on said subject a first electric signal representative of tonal information contained within said spot, modifying said signal to compress the intensity range simulated thereby of the tonal information represented thereby, deriving from an area on said subject surrounding said spot a second electric signal representative of the average tone density of said area, deriving from said area a third electric signal representative of a contrast condition therein, controlling the said modifying of said first signal as a function of said second signal in a manner to produce increased localized contrast in a replica of said subject produced from said first signal, and varying said control as a function of said third signal to reduce the rate of increase of such localized reproduced contrast as said contrast condition undergoes progressive intensification.

5. The method as in claim 4 in which said method is a color reproduction method and in which the said modifying of said first signal affects the saturation of a reproduced color of which one color component is represented by said first signal.

References Cited in the file of this patent

UNITED STATES PATENTS

| | | |
|---|---|---|
| 2,606,245 | Hall | Aug. 5, 1952 |
| 2,691,696 | Yule | Oct. 12, 1954 |
| 2,972,012 | Farber | Feb. 14, 1961 |